United States Patent
Amanai

(10) Patent No.: US 6,950,246 B2
(45) Date of Patent: Sep. 27, 2005

(54) IMAGING OPTICAL SYSTEM AND APPARATUS USING THE SAME

(75) Inventor: Takahiro Amanai, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/828,551

(22) Filed: Apr. 21, 2004

(65) Prior Publication Data
US 2005/0046970 A1 Mar. 3, 2005

(30) Foreign Application Priority Data
Apr. 23, 2003 (JP) ........................................ 2003-118532

(51) Int. Cl.$^7$ .............................. G02B 9/36; G02B 9/34
(52) U.S. Cl. ...................... 359/771; 359/772; 359/773
(58) Field of Search ................................ 359/771, 772, 359/773, 776, 780, 763, 756, 755, 754, 746, 747

(56) References Cited

U.S. PATENT DOCUMENTS

| | | | | |
|---|---|---|---|---|
| 3,868,173 A | * | 2/1975 | Miles et al. | 359/713 |
| 4,373,786 A | | 2/1983 | Yamada | 359/715 |
| 5,841,590 A | * | 11/1998 | Sato | 359/763 |
| 6,195,210 B1 | * | 2/2001 | Tochigi | 359/692 |

FOREIGN PATENT DOCUMENTS

| | | |
|---|---|---|
| JP | 58-057106 | 4/1983 |
| JP | 59-034508 | 2/1984 |
| JP | 09-258100 | 10/1997 |

\* cited by examiner

*Primary Examiner*—Timothy Thompson
(74) *Attorney, Agent, or Firm*—Pillsbury Winthrop Shaw Pittman LLP

(57) ABSTRACT

The image forming optical system comprises, in order from an object side, a first lens which is positive meniscus lens having a convex surface directed toward an object side, an aperture stop, a second lens which is positive meniscus lens having a convex surface directed toward an image side, a third lens which is positive meniscus lens having a convex surface directed toward an image side, and a fourth lens which is negative lens, wherein at least one of surfaces of the fourth lens is aspherical and the following condition is satisfied:

$$-2.0 < \phi m/\phi p < 0$$

where $\phi m$ represents the power of the fourth lens at the position of the maximum light height and $\phi p$ represents the power of the fourth lens at the position of the praxis.

The third lens and the fourth lens are made of plastic material and the following condition is satisfied:

$$15.0 < \nu 3 - \nu 4 < 40.0$$

where $\nu 3$ represents Abbe's number of the third lens and $\nu 4$ represents Abbe's number of the fourth lens.

14 Claims, 10 Drawing Sheets

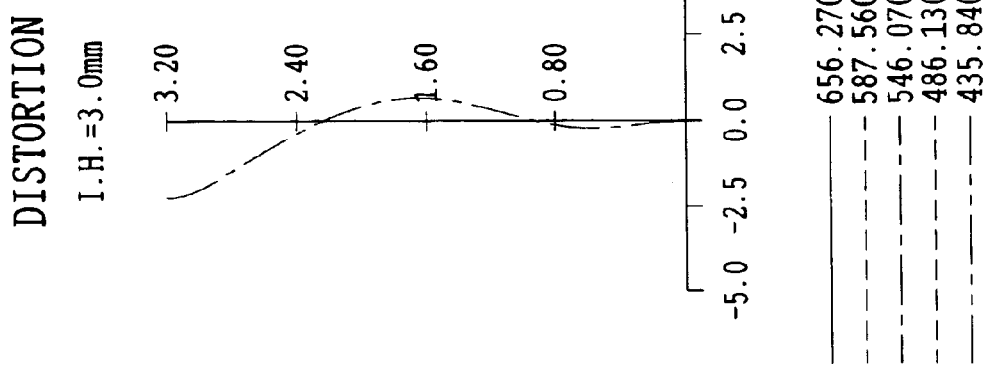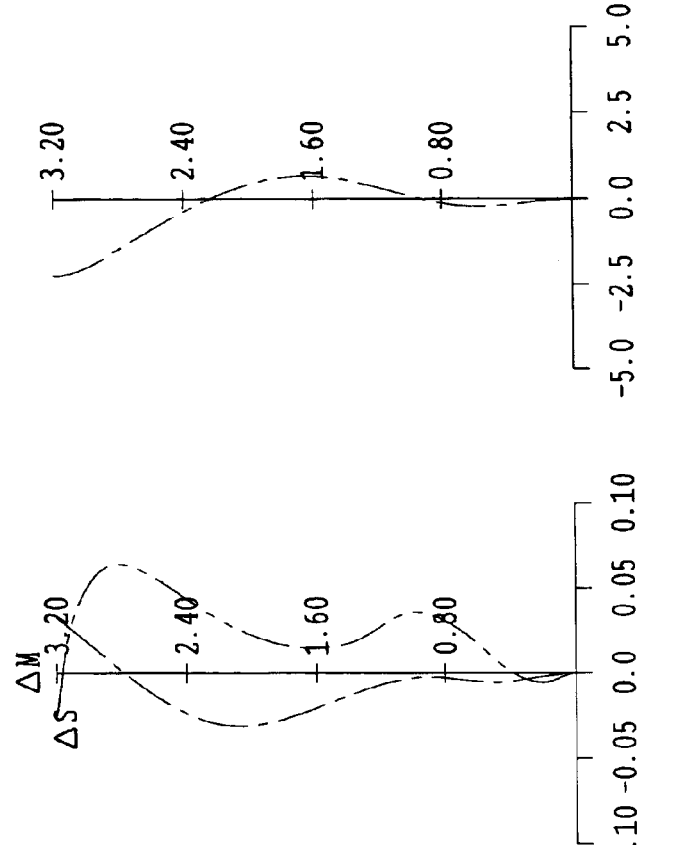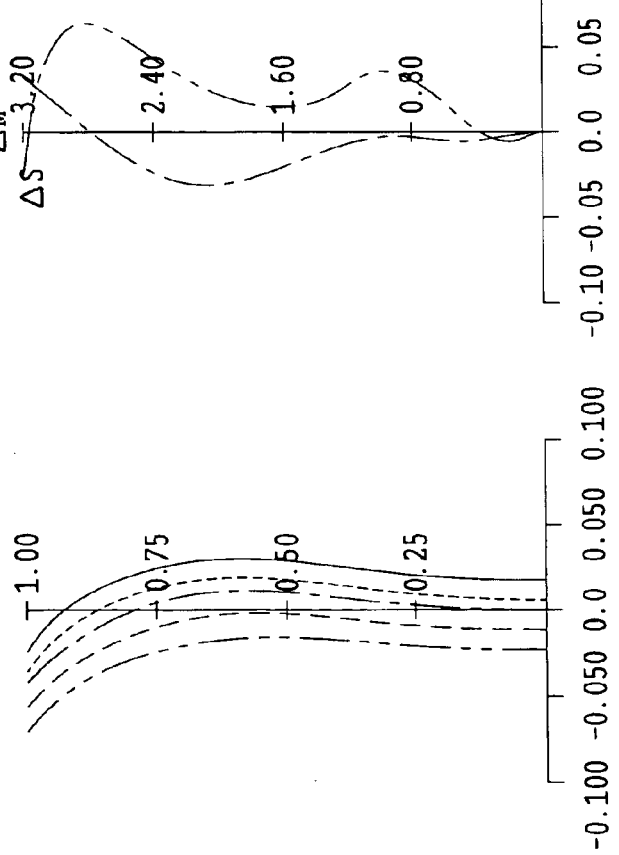

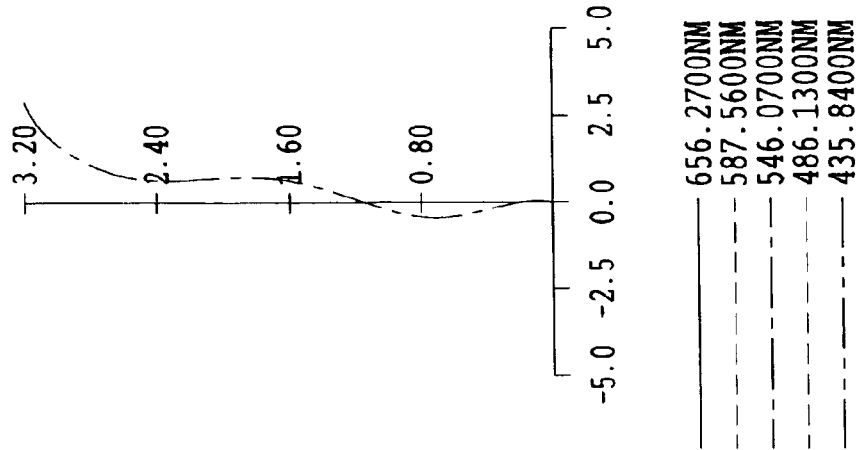
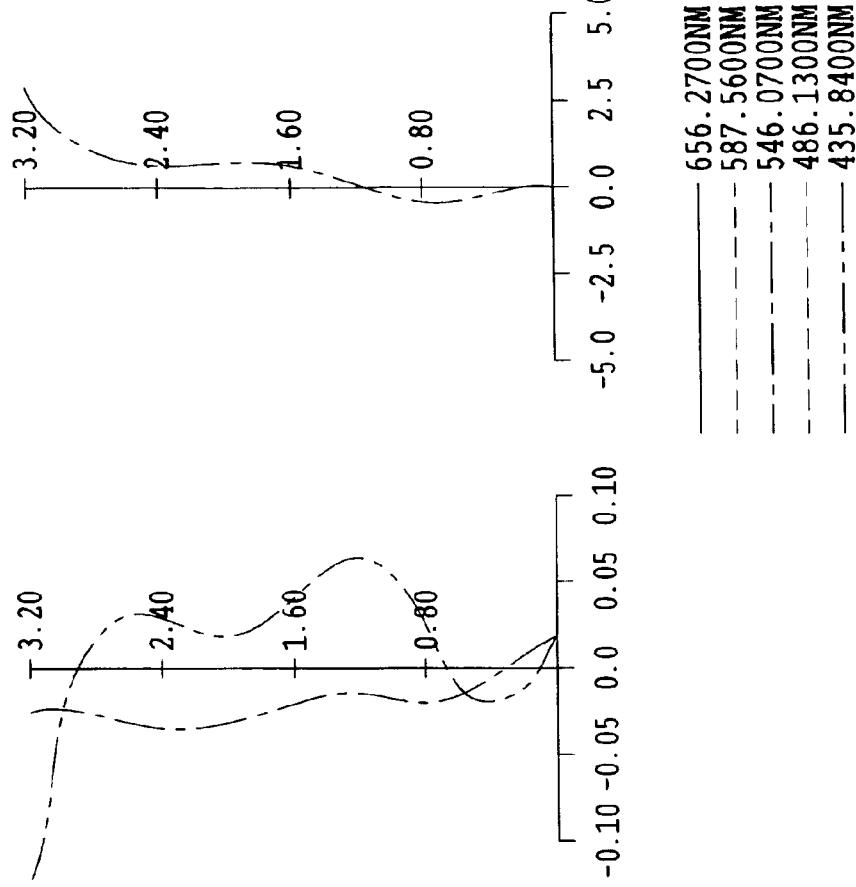
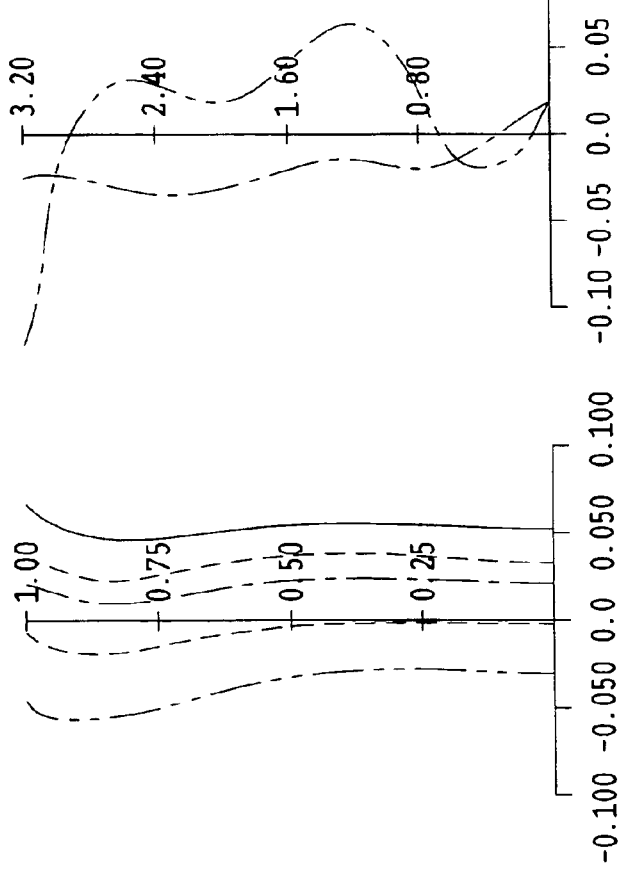

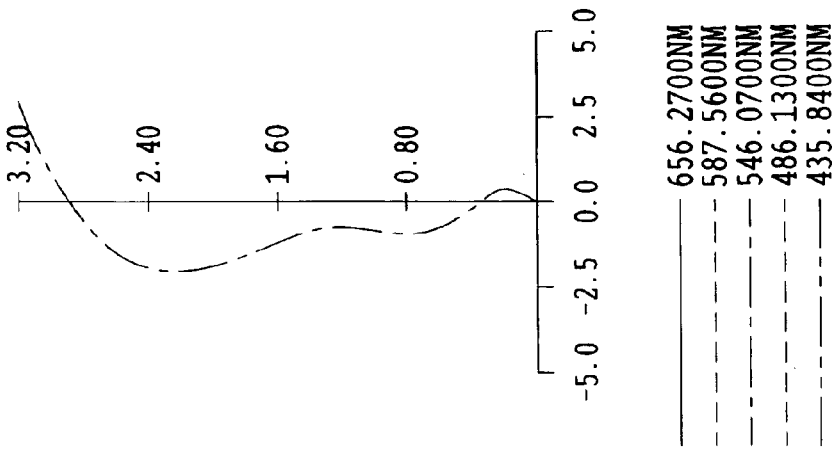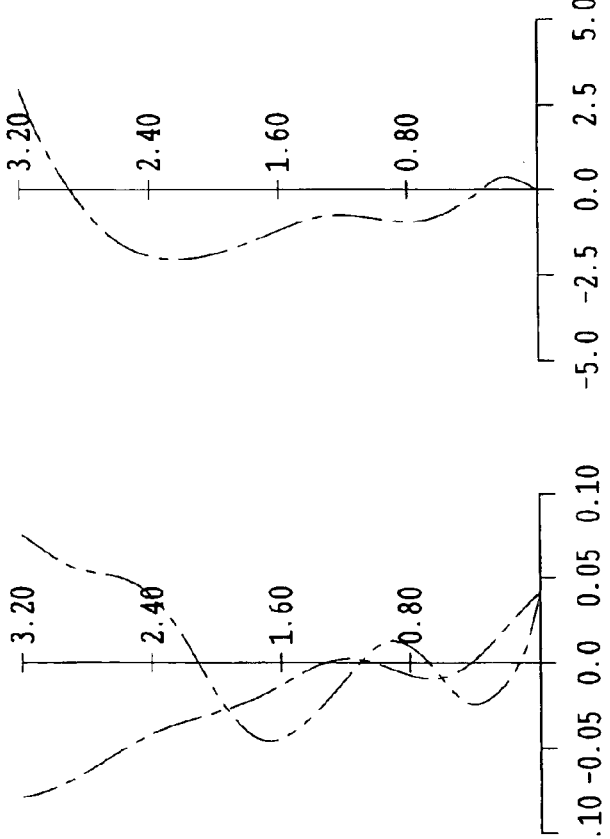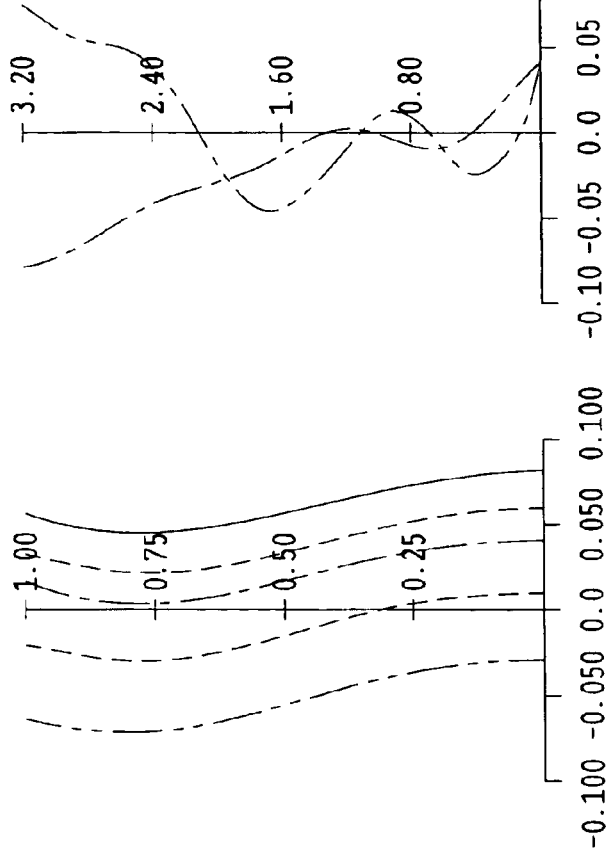

FIG.10A
FIG.10B
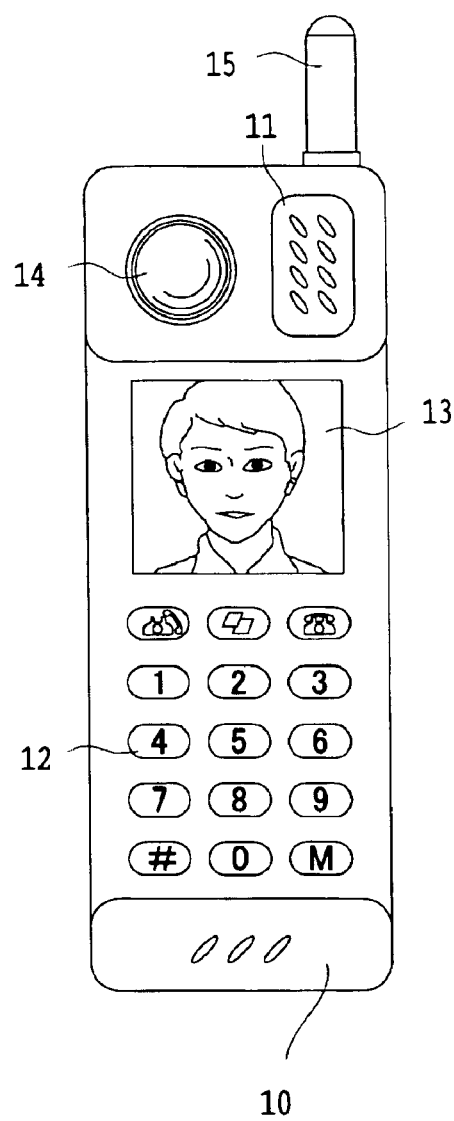
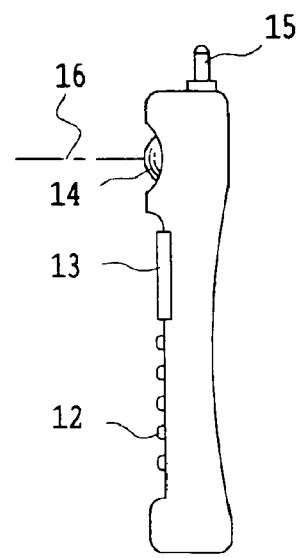

IMAGING OPTICAL SYSTEM AND APPARATUS USING THE SAME

CROSS REFERENCE TO RELATED APPLICATION

This application claims priority to Japanese Application No. 2003-118532, filed on Apr. 23, 2003.

BACKGROUND OF THE INVENTION

1. Field of the Invention

The present invention relates to an image forming optical system which can be used for an imaging unit with the solid-state imaging element of CCD, CMOS and the like. For example, it relates to an image forming optical system which can be used for a miniature camera and a monitor camera and the like which are equipped in, for example, a digital still camera, a digital video camera, a cellular phone, PC and the like. Furthermore, the present invention also relates to an electronic instrument such as a digital still camera, a digital video camera, a cellular phone, PC and the like which use the image forming optical system.

2. Description of the Related Art

In recent years, electronic cameras for taking a photograph by using a solid-state imaging element like CCD and CMOS instead of using a silver-haloid film have become popular. In such electronic cameras, for an imaging unit which is equipped in a portable type computer or a cellular phone and the like, miniaturization and weight-lightening have been particularly demanded.

SUMMARY OF THE INVENTION

The image forming optical system according to the present invention comprises, in order from an object side, a positive meniscus lens, as a first lens, having a convex surface directed toward an object side, an aperture stop, a positive meniscus lens, as a second lens, having a convex surface directed toward an image side, a positive meniscus lens, as a third lens, having a convex surface directed toward an image side, and a negative lens, as a fourth lens.

Moreover, the electronic apparatus according to the present invention comprises the image forming optical system mentioned above.

According to the present invention, a highly efficient image forming optical system can be obtained, wherein performance degradation due to a manufacture error when it is miniaturized is little.

Moreover, a highly efficient electric apparatus can be obtained even if it is miniaturized.

These and other features and advantages of the present invention will become apparent from the following detailed description of the preferred embodiments when taken in conjunction with the accompanying drawings.

BRIEF DESCRIPTION OF THE DRAWINGS

FIGS. 4A, 4B and 4C are diagrams showing spherical aberration, astigmatism and distortion in the second embodiment of an image forming optical system according to the present invention.

FIGS. 6A, 6B and 6C are diagrams showing spherical aberration, astigmatism and distortion in the third embodiment of an image forming optical system according to the present invention.

FIGS. 8A, 8B and 8C are diagrams showing a spherical aberration, an astigmatism and a distortion in the fourth embodiment of an image forming optical system according to the present invention.

FIGS. 10A and 10B are a front perspective view and a rear perspective view showing an outlined construction of a digital camera embodied by an image forming optical system according to the present invention.

DETAILED DESCRIPTION OF THE PREFERRED EMBODIMENTS

Figure 1:
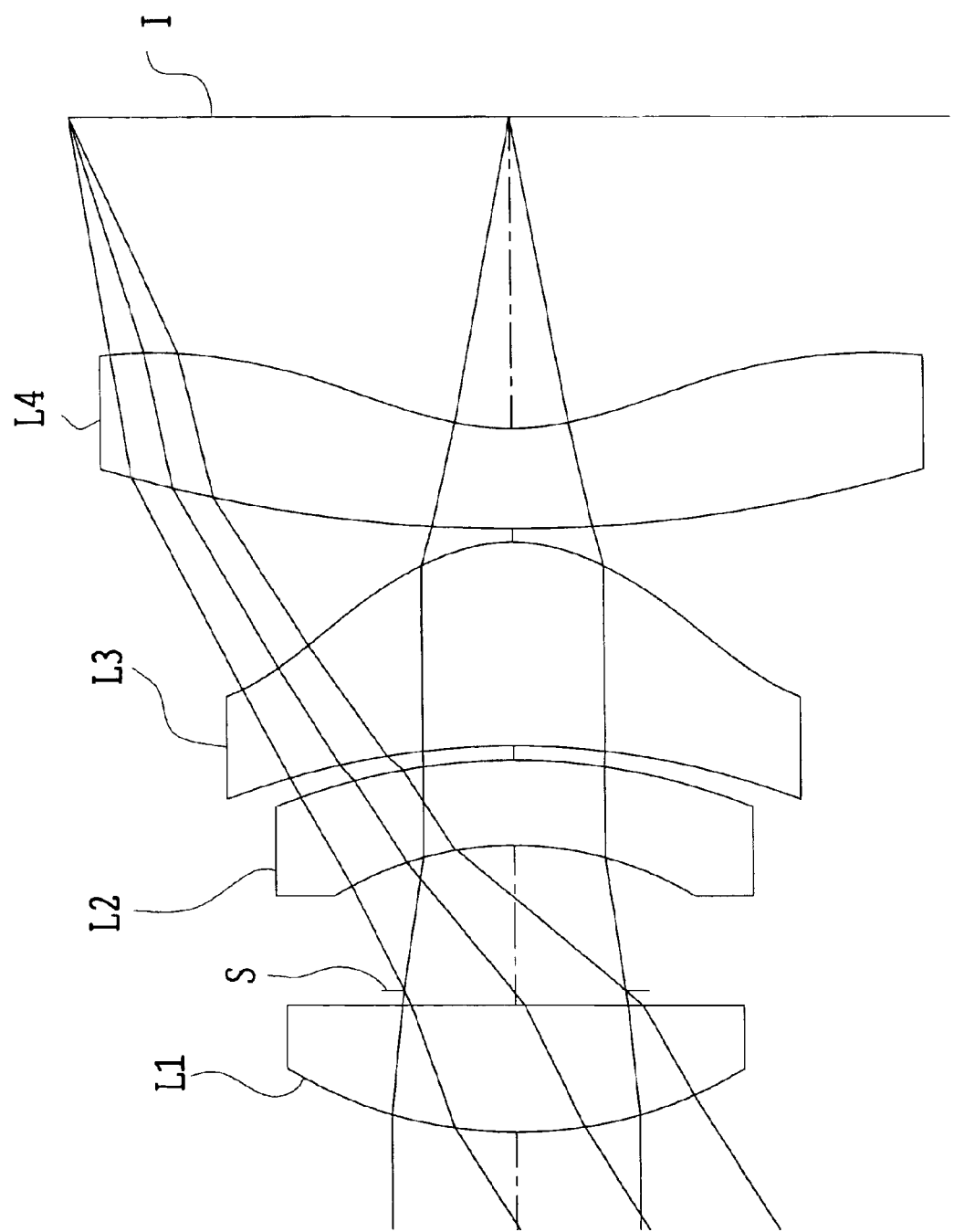
FIG. 1 is a sectional view showing an optical arrangement developed along the optical axis in the first embodiment of an image forming optical system according to the present invention.

Prior to explaining embodiments, reasons why the composition of the present invention has been made as well as function and advantages of the present invention will be explained.

Firstly, the number of lenses composing the image forming optical system. The image forming optical system of the present invention is composed of four lenses which are a first lens, a second lens, a third lens and a fourth lens as mentioned above, taking into consideration of performance and miniaturization. Here, if an image forming optical system is composed of five or more lenses, it is evident that the performance is improved further. However, if the number of lens increases by one, the thickness of a lens, the distance between lenses and the space of frame increase accordingly, and enlarging of the size is inevitable.

As mentioned in the Description of the Related Art of this specification, in case that an image forming optical system is composed of two lenses or less than two lenses, coexistence of reduction of chromatic aberration on the axis and a reduction of a curvature of field is difficult. Even if many aspherical surfaces are used in order to secure performance, manufacture is difficult since decentering sensitivity becomes large. Therefore, as for performance and size, it is the most appropriate that an image forming optical system is composed of four lenses like the present invention.

Next, it is assumed that CCD, for example, as an imaging element is used for an apparatus using an image forming optical system. In such case, in order to maintain a good performance for condensing light, the incident angle of light to an imaging element must be made small. For this purpose, it is desirable to arrange an aperture stop at a distant position from an image surface, or to arrange an image of the aperature stop at a distant position from an image surface.

In a wide angle optical system, it is necessary to reduce generation of distortion in a peripheral portion and chromatic aberration of magnification. For this purpose, it is desirable to arrange an aperture stop at the position where power arrangement of an optical system becomes symmetrical.

From two reasons mentioned above, in the image forming optical system of the present invention, the aperture stop is arranged between the first lens and the second lens. That is, the image forming optical system of the present invention is constituted as an optical system in which wide angle and telecentric function are much noted as important factors.

In the image forming optical system of the present invention, a first lens is composed of a meniscus lens, which has strong positive power and a curved surface directed toward an object side. By such composition, it becomes advantageous for shortening a total length, since a principal position of the first lens can be moved to the object side.

Further, in the image forming optical system of the present invention, a first lens is composed of a meniscus lens which has positive power and a convex surface directed toward an object side, and each of a second lens and a third lens is composed of a meniscus lens which has positive power and a convex surface directed toward an image side. By such arrangement, deflection angle, that is, an angle which is formed by an incident light and an emanated light, can be kept small, and generation of an aberration at each refracting surface can be suppressed. A fluctuation of the performance of lens at the relative decentering state can be small to the utmost since an amount of aberration generated at non decentering state is small.

As mentioned above, in order to make a total length of an optical system small, the fourth lens is composed as power arrangement of negative power in the image forming optical systems of this invention. However, if the lens at utmost image side has negative power in a wide angle system, the following inconvenience arises. In this case, it becomes impossible to make an incident angle of light small in a high position of light height.

Then, in the lens at utmost image side, at least one surface is formed to be aspherical. And, by making power of peripheral portion of the lens positive, a light at a high position of light height can be refracted toward an optical axis, even if the power of the center portion of the lens is negative. As a result, it becomes possible to make an incident angle of the light to the image side small.

Therefore, it is important to satisfy the following condition (1) in the fourth lens which is a lens at utmost image side in the present invention:

$$-2.0<\phi m/\phi p<0 \tag{1}$$

where $\phi m$ represents a power of the fourth lens at the position of the maximum light height and $\phi p$ represents a power of the fourth lens at the position of paraxis.

Here, the power $\phi m$ of the lens at the position with the maximum light height is defined as follows. It is given by $\phi m=\tan \xi/Hm$, when a parallel light is entered to the maximum light height Hm of the lens to be an object from the infinite point of the object side, and an inclined angle after passing through the lens is $\xi$.

When it is less than the lower limit of this condition (1), positive power of the peripheral portion becomes too much strong and performance of the peripheral portion becomes deteriorated remarkably. On the other hand, when exceeding the upper limit of this condition (1), positive power of the peripheral portion of the fourth lens becomes too much weak and correction of the incident angle of the light becomes insufficient.

Preferably, in the image forming optical system of the present invention, it is desirable to satisfy the following condition (1'):

$$-1.0<\phi m/\phi p<0 \tag{1'}$$

Further, preferably in the image forming optical system of the present invention, it is desirable to satisfy the following condition (1''):

$$-0.5<\phi m/\phi p<0 \tag{1''}$$

Furthermore, a plastic lens is used as a lens composing the image forming optical system of present invention.

By this way, compared with the case where it is composed of glass, productivity will improve greatly.

Furthermore, a lens holding component is arranged at the outside of an effective diameter of the lens. Then, by composing such that each of lenses is cemented together, the manpower-day for assembling can be reduced, and it is advantageous for reduction in cost.

In the image forming optical system of the present invention, it is important to satisfy the following condition (2) in order to correct a chromatic aberration generated in the first lens and the second lens:

$$15.0<v3-v4<40.0 \tag{2}$$

where v3 represents Abbe's number of the third lens and v4 represents Abbe's number of the fourth lens.

When exceeding the upper limit of this condition (2), correction of chromatic aberration generated in the first lens and the second lens becomes excessive. On the other hand, if less than the lower limit of a condition (2), correction of the chromatic aberration generated in the first lens and the second lens will become insufficient.

In the image forming optical system of the present invention, it is desirable to satisfy the following condition (2'):

$$20.0<v3-v4<35.0 \tag{2'}$$

Further, preferably in the image forming optical system of the present invention, it is desirable to satisfy the following condition (2''):

$$24.0<v3-v4<29.0 \tag{2''}$$

In order to make a total length of an optical system small, it is necessary to arrange a position of the principal point of the whole optical system at the object side.

Therefore, the power of the first lens becomes important. Therefore, in the imaging optical system of present invention, it is desirable to satisfy the following condition (3):

$$0.1<r1f/f<2.0 \tag{3}$$

where r1f represents a radius of curvature of the first lens at an object side and f is a focal length of the image forming optical system as a whole system.

When exceeding the upper limit of this condition (3), the radius of curvature of the first surface becomes large and the position of the principal point of the first lens having positive power becomes at the image side. In this case, power of each lens must be strengthened in order to shorten total length, and it becomes difficult to take out performance.

On the other hand, when it is less than the lower limit of the condition (3), it is advantageous to shorten total length. However, correction of the spherical aberration generated at the first surface becomes difficult.

Further, preferably in the image forming optical system of the present invention, it is desirable to satisfy the following condition (3'):

$$0.2 < r1f/f < 1.2 \tag{3'}$$

Further, it is desirable to satisfy the following condition (3"):

$$0.3 < r1f/f < 0.9 \tag{3"}$$

The optical system of the present invention is a telephoto type optical system by composite power of the first lens, the second lens and the third lens, and the negative power of the fourth lens in order to shorten total length. Then, it is desirable to satisfy the following conditions (4) and (5). If these conditions are satisfied, shortening total length and keeping performance of the image forming optical system can be achieved with sufficient balance to arrangement of positive power and negative power of this telephoto type.

$$0.5 < f123/|f4| < 3.0 \tag{4}$$

$$1.0 < f/|f4| < 5.0 \tag{5}$$

where f123 represents a composite focal length of the first lens, the second lens and the third lens, f4 represents a focal length of the fourth lens, and f represents a focal length of the whole optical system.

If the conditions (4) and (5) are not satisfied, balance of positive power and negative power which compose the telephoto type will collapse, and the total length of the optical system will increase, or performance of the optical system will deteriorate.

That is, when exceeding the upper limit of the condition (4) or (5), it becomes disadvantageous for shortening the total length of the optical system since the negative power which composes the telephoto type becomes weak.

On the other hand, if it is less than the lower limit of the condition (4) or (5), negative power which composes the telephoto type becomes strong too much, and accordingly positive power must be also strengthened.

As a result, an amount of aberration generated in each lens increases, and it becomes difficult to secure performance.

Preferably, in the image forming optical system of the present invention, it is desirable to satisfy the following conditions (4') and (5'):

$$0.7 < f123/|f4| < 2.0 \tag{4'}$$

$$1.2 < f/|f4| < 4.0 \tag{5'}$$

More preferably, in the image forming optical system of the present invention, it is desirable to satisfy the following condition (4") and (5"):

$$0.9 < f123/|f4| < 1.6 \tag{4"}$$

$$1.5 < f/|f4| < 3.0 \tag{5"}$$

In the image forming optical system of the present invention, the first lens and the second lens, between which an aperture stop is located, and the third lens and the fourth lens are arranged. Here, in order to make magnification chromatic aberration and distortion small, it becomes important that an off-axial light passes in point symmetry to the center position of the aperture stop.

Therefore, it is desirable to satisfy the following condition (6):

$$0 < f1/f234 < 3.0 \tag{6}$$

where f1 represents a focal length of the first lens, and f234 represents a composite focal length of the second lens the third lens and the fourth lens.

If it exceeds the upper limit, or it is less than the lower limit of the condition (6), magnification chromatic aberration and distortion become in excessive correction or insufficient correction. As a result, in any case, performance of circumference becomes worse.

In the image forming optical system of the present invention, it is desirable to satisfy the following condition (6'):

$$0.2 < f1/f234 < 1.0 \tag{6'}$$

More preferably, in the image forming optical system of the present invention, it is desirable to satisfy the following condition (6'):

$$0.4 < f1/f234 < 0.7 \tag{6"}$$

By the way, when CCD is used for an imaging element, the phenomenon so-called shading occurs. This is the phenomenon in which the brightness of the picture image differs at the center portion of the picture image and at the peripheral portion of the picture image when an off-axis light flux emanated from an optical system enters into an image surface. On the other hand, if an incident angle to the image surface is small, the shading problem is mitigated. However, in this case, the whole length of imaging optical system becomes long.

Thus, in the image forming optical system of the present invention, it is desirable to satisfy the following condition (7):

$$0.4 < EXP/f < 2.0 \tag{7}$$

where EXP represents a distance of the exit pupil from an image surface and f represents a focal length of the image forming optical system as a whole system.

If it exceeds the upper limit of the condition (7), the total length of the image forming optical system becomes long. On the other hand, if it is less than the lower limit of the condition (8), the angle of incidence to CCD becomes large too much, and the brightness of peripheral portion of a picture image decreases.

In the image forming optical system of the present invention, it is desirable to satisfy the following condition (7'):

$$0.6 < EXP/f < 1.5 \tag{7"}$$

More preferably, in the image forming optical system of the present invention, it is desirable to satisfy the following condition (7"):

$$0.8 < EXP/f < 1.3 \tag{7"}$$

It is desirable to satisfy the following condition:

$$0.40[1/\mu m] < Fno/P[\mu m] < 2.20[1/\mu m]$$

where Fno represents F number fully opened of the image forming optical system and P represents the pixel pitch of an imaging element.

When exceeding the upper limit of the condition, the optical system becomes too dark, or a light quantity per one picture element becomes small since the pixel pitch of the picture element becomes too small. Therefore, shutter speed becomes slow, and this brings a cause of hand blur and increase of noise owing to long exposure time. On the other hand, when it is less than the lower limit of the condition, the pixel pitch of the picture element becomes too large and an imaging data with fine pixel pitch cannot be obtained.

Further, it is desirable to satisfy the following condition:

$$0.55[1/\mu m] < Fno/P[\mu m] < 1.50[1/\mu m]$$

Further more, it is much desirable to satisfy the following condition:

$$0.77[1/\mu m] < Fno/P[\mu m] < 1.18[1/\mu m]$$

When it is defined that TL represents the whole length of the image forming optical system and ML represents the minimum thickness on the axis of a plastic lens composing the image forming optical system, it is more desirable to satisfy the following condition:

$$0.02 < ML/TL < 0.20$$

When exceeding the upper limit of this condition, thickness on the axis of a plastic lens to the whole length becomes too large. Therefore, a thickness of the center portion of a glass lens cannot be sufficiently secured, and the processability of the glass lens gets worse. On the other hand, if it is less than the lower limit, it is impossible for plastic resin to enter smoothly into a formation die at the time of molding, because the minimum thickness on the axis of the plastic lens is too small. As a result, as a stress is generated, it may cause double refraction, and productivity is aggravated since longer time is consumed for molding.

Further, it is desirable to satisfy the following condition:

$$0.04 < ML/TL < 1.16$$

Furthermore, it is much desirable to satisfy the following condition:

$$0.06 < ML/TL < 0.10$$

Hereafter, embodiments of the present invention will be explained using drawings.

The First Embodiment

Figure 2:
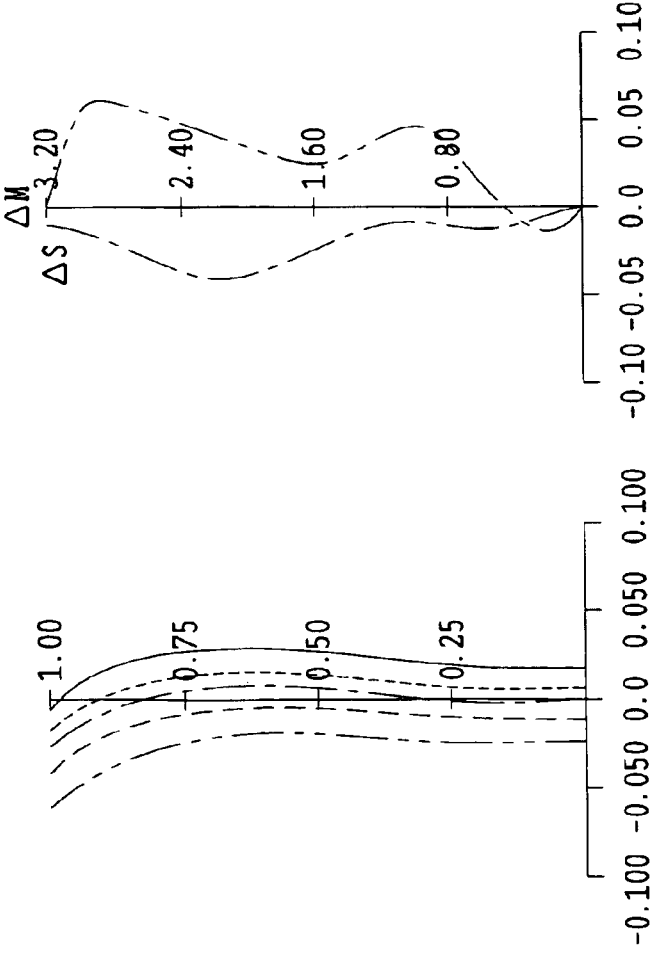
FIGS. 2A, 2B and 2C are diagrams showing spherical aberration, astigmatism and distortion in the first embodiment of an image forming optical system according to the present invention.

FIG. 1 is a sectional view showing an optical arrangement developed along the optical axis in the first embodiment of an image forming optical system according to the present invention. FIGS. 2A, 2B and 2C show spherical aberration, astigmatism and distortion at the focusing state of an image forming optical system in the first embodiment respectively.

The image forming optical system of the first embodiment comprises in order from an object side, a positive meniscus lens L1, an aperture stop S, a negative meniscus lens L2, a positive meniscus lens L3, and a negative lens L4. In this Figure, the reference symbol I represents an image surface of an imaging element.

The positive meniscus lens L1 is the first lens. This positive meniscus lens L1 has a convex surface directed toward the object side. The negative meniscus lens L2 is the second lens. This negative meniscus lens L2 has a convex surface directed toward an image side. The positive meniscus lens L3 is the third lens. This positive meniscus lens L3 has a convex surface directed toward the image side. The negative lens L4 is the fourth lens.

An aspherical surface is formed on a surface at the object side of the negative meniscus lens L2, a surface at the image side of the positive meniscus lens L3, and a surface of the negative lens L4 respectively. The aspherical surface of the fourth lens L4 has negative power in the center portion of the lens and positive power in the peripheral portion of the lens.

Lens data of optical members composing the image forming optical system of the first embodiment are listed below.

In the first embodiment, all of lenses are made of plastic. As plastic materials used here, Zeonex which is polyolefin material is used for the first lens and the third lens, and polycarbonate is used for the second lens and the fourth lens.

On the image surface of the image forming optical system, an imaging element having 3.000,000 pixels (a pitch of picture element 2.4 $\mu$m) in ⅓ inches square is arranged.

In numerical data of the first embodiment, refracting indexes and Abbe's numbers are at e ray. Also, when z is taken as the coordinate in the direction of the optical axis, y is taken as the coordinate normal to the optical axis, K represents a conic constant, and a, b, c, and d represent aspherical coefficients, the configuration of each of the aspherical surface is expressed by the following equation:

$$z = (y^2/r) / \left[ 1 + \{1 - (1+K)(y/r)^2\}^{1/2} \right] + ay^4 + by^6 + cy^8 + dy^{10}$$

These symbols hold for the numerical data of embodiments to be described later.

| | numerical data 1 the focal length: 4.60 mm Fno (fully opened F number): 2.8 the image height: 3.0 mm the half field angle: 33°. | | | |
|---|---|---|---|---|
| Surface No. | Radius curvature | Surface distance (Air space) | Refraction Index | Abbe's No. |
| object surface | ∞ | ∞ | | |
| 1 | 2.95 | 0.87 | 1.5091 | 56.2 |
| 2 | 233.13 | 0.10 | | |
| 3 | aperture stop surface | 1.00 | | |
| 4 | aspherical [1] | 0.60 | 1.5839 | 30.2 |
| 5 | −4.14 | 0.10 | | |
| 6 | −5.47 | 1.41 | 1.5091 | 56.2 |
| 7 | aspherical [2] | 0.10 | | |
| 8 | 9.20 | 0.70 | 1.5839 | 30.2 |
| 9 | aspherical [3] | 0.63 | | |
| 10 | ∞ | 1.50 | | |
| image surface | ∞ | | | | aspherical [1]
radius of curvature −2.27 k = 5.8166 × 10$^{-1}$
a = −2.9072 × 10$^{-2}$    b = 3.2484 × 10$^{-2}$    c = −3.8009 × 10$^{-3}$ aspherical [2]
radius of curvature −0.97 k = −2.9953 × 10$^{+0}$
a = −4.7166 × 10$^{-2}$    b = 1.0868 × 10$^{-2}$ aspherical [3]
radius of curvature 1.31 k = −7.6191 × 10$^{+0}$
a = −6.7292 × 10$^{-3}$

The Second Embodiment

Figure 3:
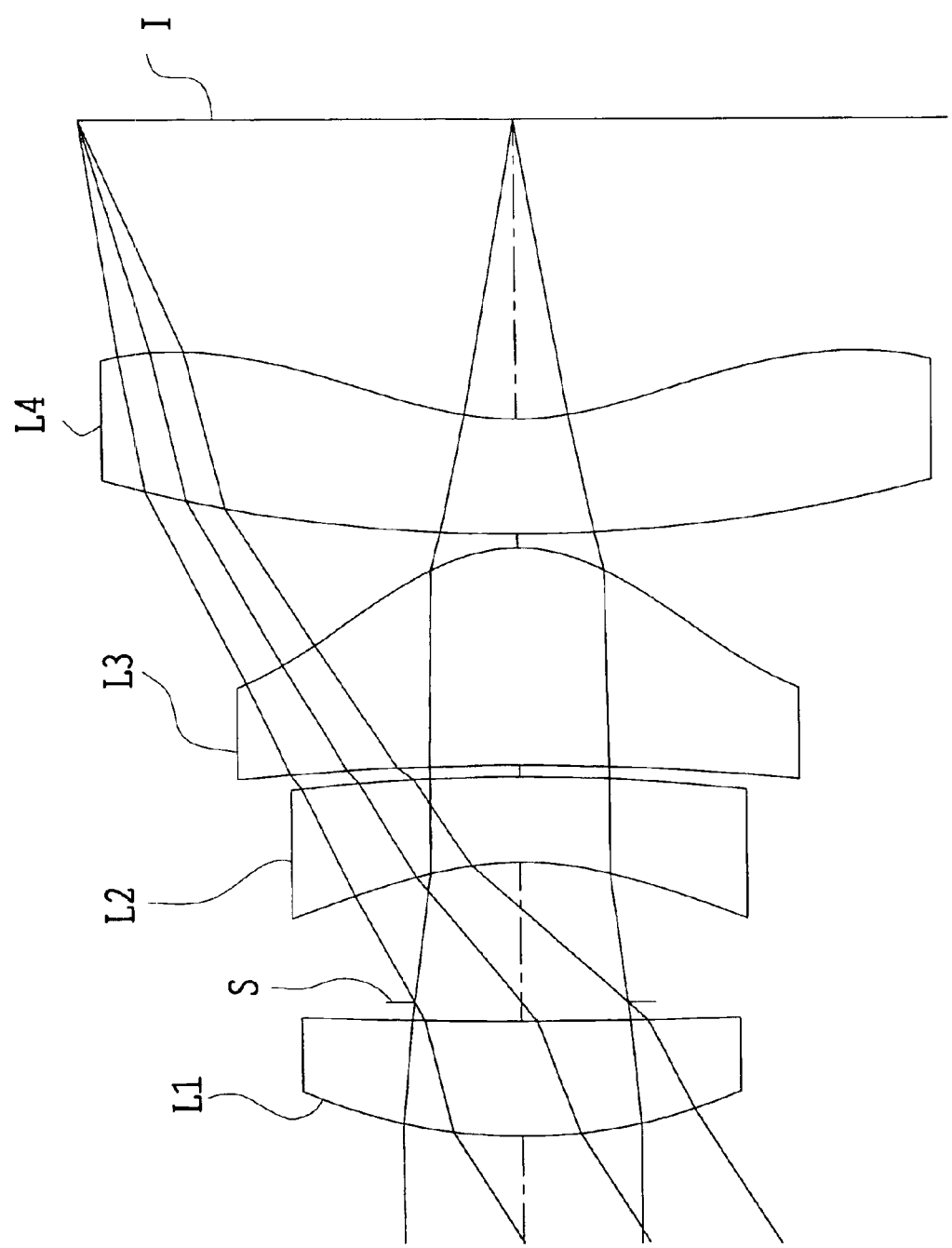
FIG. 3 is a sectional view showing an optical arrangement, developed along the optical axis in the second embodiment of an image forming optical system according to the present invention.

FIG. 3 is a sectional view showing an optical arrangement developed along the optical axis in the second embodiment of an image forming optical system according to the present invention. FIGS. 4A, 4B and 4C are diagrams showing spherical aberration, astigmatism and distortion of an image forming optical system in the second embodiment respectively.

The image forming optical system of the second embodiment comprises in order from an object side, a positive meniscus lens L1, an aperture stop S, a negative meniscus lens L2, a positive meniscus lens L3, and a negative lens L4. In this Figure, the reference symbol I represents an image surface of an imaging element.

The positive meniscus lens L1 is the first lens, a convex surface of which is directed toward the object side. The negative meniscus lens L2 is the second lens. This negative meniscus lens L2 has a convex surface directed toward an image side. The positive meniscus lens L3 is the third lens. This positive meniscus lens L3 has a convex surface directed toward the image side. The negative lens L4 is the fourth lens.

An aspherical surface is formed on a surface at the object side of the negative positive meniscus lens L2, a surface at the image side of the positive meniscus lens L3, and a surface at the image side of the negative lens L4. The aspherical surface of the fourth lens L4 has negative power in the center portion of the lens and positive power in the peripheral portion of the lens.

Lens data of optical members composing the image forming optical system of the second embodiment are listed below.

In the second embodiment, the first lens is made of glass, and the second lens, the third lens and the fourth lens are made of plastic. As plastic materials used here, Zeonex which is polyolefin material is used for the third lens and polycarbonate is used for the second lens and the fourth lens.

On the image surface of the image forming optical system, an imaging element having 2,000,000 pixels (a pitch of picture element 3.0 μm) in ⅓ inches square is arranged.

numerical data 2
the focal length: 4.60 mm
Fno (fully opened F number): 2.8
the image height: 3.0 mm
the half field angle: 33°

| Surface No. | Radius curvature | Surface distance (Air space) | Refraction Index | Abbe's No. |
|---|---|---|---|---|
| object surface | ∞ | ∞ | | |
| 1 | 3.78 | 0.78 | 1.7433 | 49.2 |
| 2 | 25.69 | 0.11 | | |
| 3 | aperture stop surface | 0.98 | | |
| 4 | aspherical [1] | 0.60 | 1.5839 | 30.2 |
| 5 | −13.16 | 0.08 | | |
| 6 | −19.41 | 1.50 | 1.5091 | 56.2 |
| 7 | aspherical [2] | 0.10 | | |
| 8 | 10.28 | 0.80 | 1.5839 | 30.2 |
| 9 | aspherical [3] | 0.56 | | |
| 10 | ∞ | 1.50 | | |
| image surface | ∞ | | | | aspherical [1]
radius of curvature −2.77

$k = 7.8076 \times 10^{-1}$
$a = -2.1697 \times 10^{-2}$  $b = 2.7786 \times 10^{-2}$  $c = -3.9258 \times 10^{-3}$ aspherical [2]
radius of curvature −1.05

$k = -3.0607 \times 10^{+0}$
$a = -4.1942 \times 10^{-2}$  $b = 1.0402 \times 10^{-2}$ aspherical [3]
radius of curvature 1.43

$k = -8.0802 \times 10^{+0}$
$a = -7.3101 \times 10^{-3}$

The Third Embodiment

Figure 5:
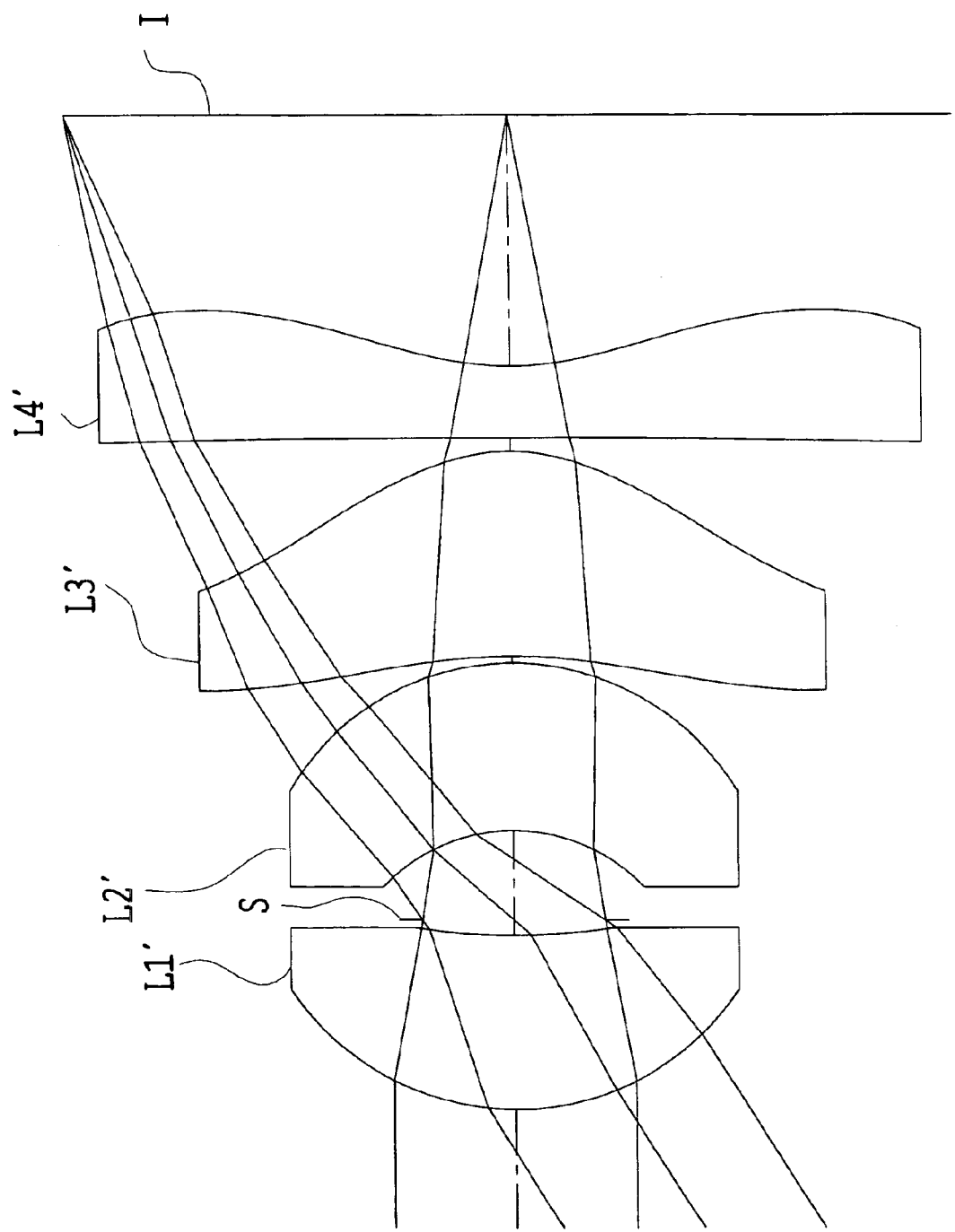
FIG. 5 is a sectional view showing an optical arrangement, developed along the optical axis in the third embodiment of an image forming optical system according to the present invention.

FIG. 5 is a sectional view showing an optical arrangement developed along the optical axis in the third embodiment of an image forming optical system according to the present invention. FIGS. 6A, 6B and 6C are diagrams showing spherical aberration, astigmatism and distortion of an image forming optical system in the third embodiment respectively.

The image forming optical system of the third embodiment comprises, in order from an object side, a positive meniscus lens L1', an aperture stop S, a positive meniscus lens L2', both surfaces of which are aspherical, a positive meniscus lens L3', and a negative lens L4'. In this Figure, the reference symbol I represents an image surface of an imaging element.

The positive meniscus lens L1' is the first lens. This positive meniscus lens L1' has a convex surface directed toward the object side. The positive meniscus lens L2' is the second lens. This positive meniscus lens L2' has a convex surface directed toward an image side. The positive meniscus lens L3' is the third lens. This positive meniscus lens L3' has a convex surface directed toward the image side. The negative lens L4' is the fourth lens.

An aspherical surface is formed on both surfaces of the positive meniscus lens L1', both surfaces of the negative meniscus lens L2', both surfaces of the positive meniscus lens L3' and both surfaces of the negative lens L4'. The aspherical surface of the fourth lens L4' has negative power in the center portion of the lens and positive power in the peripheral portion of the lens.

Lens data of optical members composing the image forming optical system of the third embodiment are listed below.

In the third embodiment, all of the lenses are made of plastic. As plastic materials used here, Zeonex which is polyolefin material is used for the first lens, the second lens and the third second lens L3, and polycarbonate is used for the fourth lens.

On the image surface of the image forming optical system ,an imaging element having 1,300,000 pixels (a pitch of picture element 3.6 μm) in ⅓ inches square is arranged.

numerical data 3
the focal length: 4.7 mm
Fno (fully opened F number): 2.08
the image height: 3.0 mm
half field angle: 33°.

| Surface No. | Radius curvature | Surface distance (Air space) | Refraction Index | Abbe's No. |
|---|---|---|---|---|
| object surface | ∞ | ∞ | | |
| 1 | aspherical [1] | 1.22 | 1.5091 | 56.2 |
| 2 | aspherical [2] | 0.10 | | |
| 3 | aperture stop surface | 0.63 | | |
| 4 | aspherical [3] | 1.18 | 1.5091 | 56.2 |
| 5 | aspherical [4] | 0.05 | | |
| 6 | aspherical [5] | 1.46 | 1.5091 | 56.2 |
| 7 | aspherical [6] | 0.10 | | |

-continued numerical data 3
the focal length: 4.7 mm
Fno (fully opened F number): 2.08
the image height: 3.0 mm
half field angle: 33°.

| 8 | aspherical [7] | 0.50 | 1.5839 | 30.2 |
|---|---|---|---|---|
| 9 | aspherical [8] | 0.44 | | |
| 10 | ∞ | 1.32 | | |
| image surface | ∞ | | | | aspherical [1]
radius of curvature 1.90

$k = -3.7539 \times 10^{-1}$
$a = 1.2801 \times 10^{-2}$   $b = 6.8695 \times 10^{-3}$ aspherical [2]
radius of curvature 5.28

$k = 1.5098 \times 10^{+1}$
$a = -3.2940 \times 10^{-3}$   $b = -2.5345 \times 10^{-2}$ aspherical [3]
radius of curvature −1.51

$k = 1.3544 \times 10^{+0}$
$a = -2.1703 \times 10^{-2}$   $b = -6.3127 \times 10^{-3}$   $c = -8.1155 \times 10^{-3}$ aspherical [4]
radius of curvature −1.49

$k = -1.2296 \times 10^{+0}$
$a = -3.3113 \times 10^{-3}$   $b = -1.1439 \times 10^{-2}$ aspherical [5]
radius of curvature −4.39

$k = 1.9660 \times 10^{+0}$
$a = 9.3712 \times 10^{-3}$   $b = 2.7884 \times 10^{-3}$ aspherical [6]
radius of curvature −1.13

$k = -4.0965 \times 10^{+0}$
$a = -3.0803 \times 10^{-2}$   $b = 5.7752 \times 10^{-3}$ aspherical [7]
radius of curvature 143.88

$k = -3.5486 \times 10^{+19}$
$a = -1.7624 \times 10^{-3}$   $b = 1.5002 \times 10^{-4}$ aspherical [8]
radius of curvature 1.42

Figure 7:
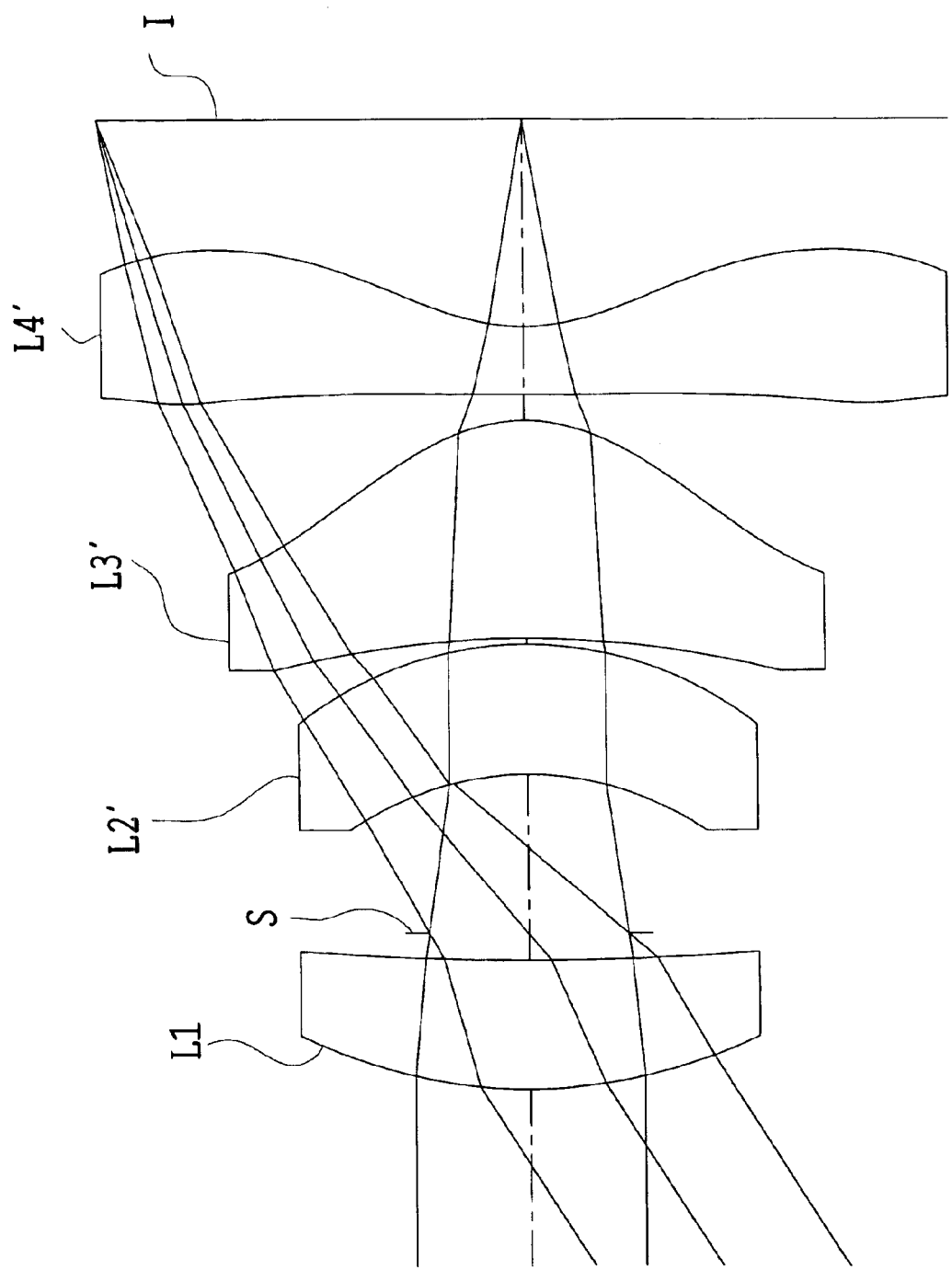
FIG. 7 is a sectional view showing an optical arrangement, developed along the optical axis in the fourth embodiment of an image forming optical system according to the present invention.

$k = -9.6398 \times 10^{+0}$
$a = -9.4524 \times 10^{-3}$   $b = 7.8945 \times 10^{-5}$ The Fourth Embodiment FIG. 7 is a sectional view showing an optical arrangement developed along the optical axis in the fourth embodiment of an image forming optical system according to the present invention. FIGS. 8A, 8B and 8C are diagrams showing spherical aberration, astigmatism and distortion of an image forming optical system in the fourth embodiment respectively.

The image forming optical system of the fourth embodiment comprises, in order from an object side, a positive meniscus lens L1', an aperture stop S, a positive meniscus lens L2', a positive meniscus lens L3', and a negative lens L4'. In this Figure, the reference symbol I represents an image surface of an imaging element.

The positive meniscus lens L1' is the first lens. This positive meniscus lens L1' has a convex surface directed toward the object side. The positive meniscus lens L2' is the second lens. This positive meniscus lens L2' has a convex surface directed toward an image side. The positive meniscus lens L3' is the third lens. This positive meniscus lens L3' has a convex surface directed toward the image side. The negative lens L4 is the fourth lens.

An aspherical surface is formed on both surfaces of the positive meniscus lens L2', both surfaces of the positive meniscus lens L3', and both surfaces of the negative lens L4' respectively. The aspherical surface of the fourth lens L4' has negative power in the center portion of the lens and positive power in the peripheral portion of the lens.

Lens data of optical members composing the image forming optical system of the fourth embodiment are listed below.

In the fourth embodiment, the first lens is made of glass, and the second lens, the third lens and the fourth lens are made of plastic. As plastic materials used here, Zeonex which is polyolefin material is used for the third lens and polycarbonate is used for the second lens and the fourth lens.

On the image surface of the image forming optical system, an imaging element having 1,300,000 pixels (a pitch of picture element 3.6 $\mu$m) in ⅓ inches square is arranged.

numerical data 4
the focal length: 4.65 mm
Fno (fully opened F number): 2.8
the image height: 3.0 mm
the half field angle: 33°

| Surface No. | Radius curvature | Surface distance (Air space) | Refraction Index | Abbe's No. |
|---|---|---|---|---|
| object surface | ∞ | ∞ | | |
| 1 | 3.80 | 0.91 | 1.8061 | 40.9 |
| 2 | 14.15 | 0.21 | | |
| 3 | aperture stop surface | 1.14 | | |
| 4 | aspherical [1] | 0.95 | 1.5091 | 56.2 |
| 5 | aspherical [2] | 0.05 | | |
| 6 | aspherical [3] | 1.58 | 1.5091 | 56.2 |
| 7 | aspherical [4] | 0.20 | | |
| 8 | aspherical [5] | 0.50 | 1.5839 | 30.2 |
| 9 | aspherical [6] | 0.61 | | |
| 10 | ∞ | 0.88 | | |
| image surface | ∞ | | | | aspherical [1]
radius of curvature −2.61

$k = -6.9628 \times 10^{-1}$
$a = -2.0780 \times 10^{-2}$   $b = -2.1734 \times 10^{-2}$   $c = 1.0103 \times 10^{-2}$ aspherical [2]
radius of curvature −2.10

$k = -1.6740 \times 10^{+0}$
$a = 1.7428 \times 10^{-2}$   $b = -6.4850 \times 10^{-3}$ aspherical [3]
radius of curvature −4.06

$k = 2.2608 \times 10^{+0}$
$a = 3.0315 \times 10^{-2}$   $b = -1.4105 \times 10^{-3}$ aspherical [4]
radius of curvature −0.88

$k = -3.4614 \times 10^{+0}$
$a = -2.8465 \times 10^{-2}$   $b = 5.5681 \times 10^{-3}$ aspherical [5]
radius of curvature 62.03

$k = -3.5486 \times 10^{+19}$
$a = -4.2958 \times 10^{-3}$   $b = 4.5975 \times 10^{-4}$ aspherical [6]
radius of curvature 0.91

$k = -6.3059 \times 10^{+0}$
$a = -1.3126 \times 10^{-2}$   $b = 4.0147 \times 10^{-4}$ In each embodiment of the present invention mentioned above, at least some of lenses are made of plastic. However, the plastic lens can be replaces by of a glass lens. For example, if the lens is composed of glass having refractive index higher than those used in each embodiment mentioned above, an optical system with higher performance can be achieved. If special low dispersion glass is used, it is effective for correction of chromatic aberration. When a lens is composed of plastic, degradation of the performance owing to environmental change can be mitigated by using low moisture-absorption material.

A flare cut stop may be used instead of an aperture stop in order to cut an unnecessary light of ghost, flare and the like. This flare cut stop may be arranged in any place which is either in front of the first lens, between the first lens and the aperture stop, between the aperture stop and the second lens, between the second lens and the third lens, or between the fourth lens and the image surface.

In order to get function of the flare cut stop, it is possible to use a method in which a flare light is cut by a frame, or another method in which a flare light is cut by arranging another member. Also, it is possible to constitute a flare cut stop by printing, painting and gluing a seal and the like, directly to the image forming optical system.

As to the shape of the flare cut stop, any type of shape formed by such as a circle, an ellipse, a rectangle, a polygon and a scope surrounded by a function curve can be also used.

By arranging a flare cut stop, it can be also constituted so as to cut not only detrimental luminous flux but also luminous flux of the coma flare and the like on around the picture plane.

Further, a coating for preventing reflection can be made to each lens in order to mitigate a ghost and flare. In this case, if a multiple coating is made, the ghost and the flare can be efficiently mitigated. Furthermore, infrared cut coating can be also made to a surface of a lens and a cover glass and the like.

In the image forming optical system of each embodiment of the present invention mentioned above, focusing can be carried out for adjusting the focus. As focusing methods, any of a type where the whole lenses or a part of lenses is moved outward for focusing or a type where the whole lenses or a part of lenses is moved inward for focusing can be used.

In the image forming optical system of each embodiment of the present invention mentioned above, decrease of the brightness around peripheral portion of a picture image surface can be mitigated by shifting a micro lens of CCD. For example, the design of the micro lens of CCD may be changed according to the incidence angle of the light at each image height. Further, correction of decreased quantity of the brightness around peripheral portion of a picture image surface can be carried out by image processing.

The optical system according to the present invention is suitable for an optical apparatus such as a camera and a surveillance camera in which film or CCD is used as recording member. Therefore, an optical device equipped with the optical system mentioned above is also included in the present invention.

Figure 9A:
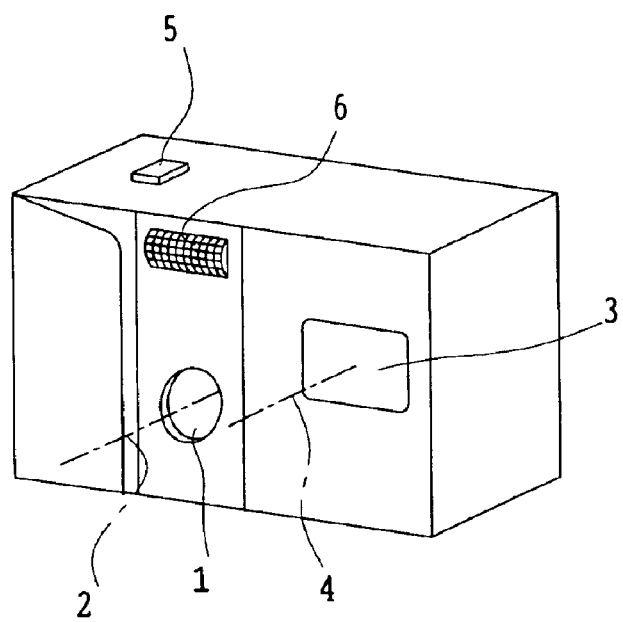
FIGS. 9A and 9B are a front view and a rear view showing an outlined construction of a cellular phone embodied by an image forming optical system according to the present invention.
Figure 9B:
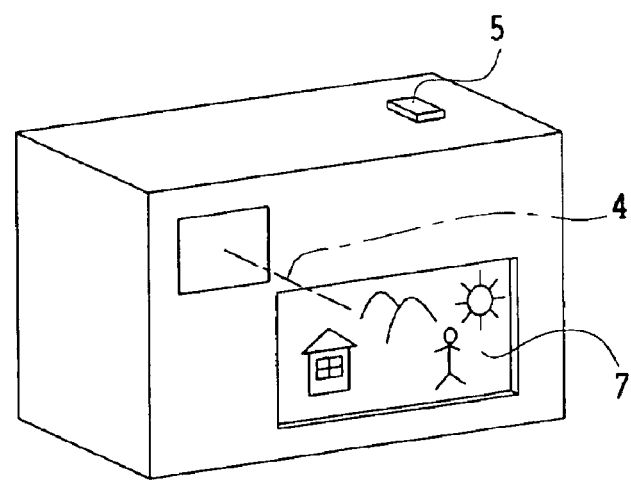

FIGS. 9A and 9B are a front perspective view and a rear perspective view showing an external appearance of a digital camera in which an image forming optical system according to the present invention is used in a photographing optical system. In FIG. 9, the reference numeral 1 represents a photographing optical system having photographing optical path 2, the reference numeral 3 is a finder optical system with an optical path 4 for finder, the reference numeral 5 is a shutter button, the reference numeral 6 is a flush lump and the reference numeral 7 is a monitor with liquid crystal display. When pressing the shutter button 5 arranged on the camera, in responding such action, photographing is carried out via the photographing optical system 1.

FIGS. 10A and 10B are a front view and a side view showing an example of a cellular phone in which an image forming optical system according to the present invention is used in a photographing optical system. In FIG. 10, the reference numeral 10 represents a microphone portion, the reference numeral 11 is a speaker portion , 12 is an input dial, 13 is a monitor, 14 is a photographing optical system and 15 is an antenna by which transmission and reception of electric waves for communication is performed. The microphone portion 10 inputs an operator's voice as information, and the speaker portion 11 outputs a communication partner's voice. The input dial 12 is used for an operator inputting information, and the monitor 13 displays information, such as photographed image of the operator as well as a telephone call partner, and a telephone number. The photographing optical system 14 has the image forming optical system of the present invention arranged on the photographing optical path 16, and the imaging element which receives an image light, which are arranged in the cellular phone. An IR cut filter is arranged in front of an imaging element, and a cover glass for protecting this optical system at the top of the photographing optical system 14 is arranged. The object image received with the imaging element is inputted into the processing means (not illustrated) which is built in the cellular phone, and is displayed as an electronic picture on the monitor 13 and/or another monitor at a communication partner's side. When transmitting a picture image to a communication partner, an information of the object image received by the imaging element is converted into a signal which can be transmitted, by the signal-processing function included in the processing means mentioned above.

The numerical values calculated by the conditions of each embodiment mentioned above are shown in the following table 1.

TABLE 1

|  | the first example | the second example | the third example | the fourth example |
| --- | --- | --- | --- | --- |
| φm/φp | −0.11 | −0.11 | −0.05 | −0.05 |
| ν3–ν4 | 26.0 | 26.0 | 26.0 | 26.0 |
| r1f/f | 0.64 | 0.82 | 0.40 | 0.82 |
| f123/|f4| | 0.97 | 0.94 | 1.12 | 1.52 |
| f/|f4| | 1.72 | 1.57 | 1.92 | 2.94 |
| f/f234 | 0.60 | 0.57 | 0.51 | 0.47 |
| EXP/f | 1.20 | 1.18 | 1.07 | 0.92 |
| Fno/P [μm] | 1.17 | 0.93 | 0.78 | 0.78 |

What is claimed is:

1. An image forming optical system consisting essentially of, in order from an object side;

a first lens, wherein the first lens is a positive meniscus lens having a convex surface directed toward an object side;

an aperture stop;

a second lens, wherein the second lens is a meniscus lens having a convex surface directed toward an image side;

a third lens, wherein the third lens is a positive meniscus lens having a convex surface directed toward the image side; and a fourth lens, wherein the fourth lens is a negative lens having at least one aspherical surface.

2. An image forming optical system comprising, in order from an object side:

a first lens, wherein the first lens is a positive meniscus lens having a convex surface directed toward an object side;

an aperture stop;

a second lens, wherein the second lens is a meniscus lens having a convex surface directed toward an image side;

a third lens, wherein the third lens is a positive meniscus lens havina a convex surface directed toward the image side; and a fourth lens, wherein the fourth lens is a negative lens, wherein at least one of surfaces of the fourth lens is aspherical and the following condition is satisfied:

$-2.0 < \Phi m/\Phi p 0$ where $\Phi m$ represents a power of the fourth lens at a position of a maximum ray height and $\Phi p$ represents a power of the fourth lens at a paraxial position, the power $\Phi m$ being given by $\Phi m = \tan \xi / Hm$, where Hm represents the maximum ray height at the fourth lens, and $\xi$ represents an inclination angle of a ray incident at the position of the maximum ray height Hm as the ray emerges from the fourth lens, out of parallel rays traveling from an abject-side infinite point $\xi$.

3. An image forming optical system according to claim 1, wherein the third lens and the fourth lens are composed of plastic material and the following condition is satisfied:

$15.0 < v3 - v4 < 40.0$ where v3 represents Abbe's number of the third lens and v4 represents Abbe's number of the fourth lens.

4. An image forming optical system according to claim 1, satisfying the following condition:

$0.1 < r1f/f < 2.0$ where r1f represents a radius of curvature of an object-side surface of the first lens, and f represents a focal length of the whole optical system.

5. An image forming optical system according to claim 1, satisfying the following conditions:

$0.5 < f123/|f4| < 3.0$ $1.0 < f/|f4| < 5.0$ where f123 represents a composite focal length of the first lens, the second lens and the third lens, and f represents a focal length of the whole optical system.

6. An image forming optical system according to claim 1, satisfying the following condition:

$0 < f1/f234 < 3.0$ where f1 represents a focal length of the first lens, and f234 represents a composite focal length of the second lens, the third lens and the fourth lens.

7. An image forming optical system comprising, in order from an object side:

a first lens, wherein the first lens is a positive meniscus lens having a convex surface directed toward an object side;

an aperture stop;

a second lens, wherein the second lens is a meniscus lens having a convex surface directed toward an image side;

a third lens, wherein the third lens is a positive meniscus lens having a convex surface directed toward the image side; and a fourth lens, wherein the fourth lens is a negative lens, satisfying the following condition:

$0.4 < EXP/f < 2.0$ where EXP represents a distance to an exit pupil from an image surface and f is a focal length of the whole image forming optical system.

8. An image forming optical system comprising, in order from an object side:

a first lens, wherein the first lens is a positive meniscus lens having a convex surface directed toward an object side;

an aperture stop;

a second lens, wherein the second lens is a meniscus lens having a convex surface directed toward an image side;

a third lens, wherein the third lens is a positive meniscus lens having a convex surface directed toward the image side; and a fourth lens, wherein the fourth lens is a negative lens, satisfying the following condition:

$0.40[1/\mu m] < Fno/P[\mu m] < 2.20[1/\mu m]$ where Fno represents a fully opened F number of the image forming optical system, and P represents a pixel interval of an image pickup element arranged on the image side of the fourth lens.

9. An image forming optical system comprising, in order from an object side:

a first lens, wherein the first lens is a positive meniscus lens having a convex surface directed toward an object side;

an aperture stop;

a second lens, wherein the second lens is a meniscus lens having a convex surface directed toward an image side;

a third lens, wherein the third lens is a positive meniscus lens having a convex surface directed toward the image side; and a fourth lens, wherein the fourth lens is a negative lens, satisfying the following condition:

$0.45 < ML/TL < 0.100$ where TL represents a total length of the image forming optical system and ML represents minimum axial thickness of plastic lenses included in the image forming optical system.

10. An electronic apparatus equipped with the image forming optical system according to claim 1.

11. An electronic apparatus equipped with the image forming optical system according to claim 2.

12. An electronic apparatus equipped with the image forming optical system according to claim 7.

13. An electronic apparatus equipped with the image forming optical system according to claim 8.

14. An electronic apparatus equipped with the image forming optical system according to claim 9.

* * * * *

UNITED STATES PATENT AND TRADEMARK OFFICE
CERTIFICATE OF CORRECTION

PATENT NO. : 6,950,246 B2 Page 1 of 1
APPLICATION NO. : 10/828551
DATED : September 27, 2005
INVENTOR(S) : Takahiro Amanai It is certified that error appears in the above-identified patent and that said Letters Patent is hereby corrected as shown below:

Col. 16, line 49
 replace "represents minimum"
 with --represents a minimum--.

Col. 15, line 12
 replace " $-2.0 < \Phi m/\Phi p 0$ "
 with -- $-2.0 < \Phi m/\Phi p < 0$ --.

Signed and Sealed this

Seventh Day of August, 2007

JON W. DUDAS
*Director of the United States Patent and Trademark Office*